(12) United States Patent
Inage

(10) Patent No.: US 8,868,309 B2
(45) Date of Patent: Oct. 21, 2014

(54) VEHICLE BEHAVIOR CONTROL APPARATUS

(71) Applicant: Nissin Kogyo Co., Ltd., Nagano (JP)

(72) Inventor: Takaaki Inage, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 13/771,744

(22) Filed: Feb. 20, 2013

(65) Prior Publication Data

US 2013/0218434 A1    Aug. 22, 2013

(30) Foreign Application Priority Data

Feb. 21, 2012   (JP) .................................. 2012-35246

(51) Int. Cl.
| | |
|---|---|
| *G06F 7/70* | (2006.01) |
| *H01Q 3/00* | (2006.01) |
| *B60T 8/58* | (2006.01) |
| *B60T 8/26* | (2006.01) |
| *B60T 8/88* | (2006.01) |
| *B60T 8/1755* | (2006.01) |
| *B60T 8/172* | (2006.01) |
| *B60T 8/171* | (2006.01) |
| *G06F 17/00* | (2006.01) |
| *B60T 8/24* | (2006.01) |
| *B60T 17/22* | (2006.01) |

(52) U.S. Cl.
CPC . *G06F 17/00* (2013.01); *B60T 8/58* (2013.01); *B60T 8/26* (2013.01); *B60T 8/885* (2013.01); *B60T 8/88* (2013.01); *B60T 8/1755* (2013.01); *B60T 2270/406* (2013.01); *B60T 8/172* (2013.01); *B60T 8/171* (2013.01); *B60T 8/24* (2013.01); *B60T 17/22* (2013.01)
USPC ........................................... 701/70; 342/359

(58) Field of Classification Search
USPC ............................................. 701/70; 342/359
See application file for complete search history.

(56) References Cited

U.S. PATENT DOCUMENTS 5,857,160 A *  1/1999  Dickinson et al. .............. 701/41
6,198,988 B1    3/2001  Tseng
(Continued)

FOREIGN PATENT DOCUMENTS

| EP | 2039573 A2 | 3/2009 |
|---|---|---|
| JP | 07149251 | 6/1995 |

(Continued)

OTHER PUBLICATIONS

Extended European Search Report for Application No. 13156133.4-1756, date of completion of search—Jun. 19, 2013, 6 pages.

(Continued)

*Primary Examiner* — Thomas G Black
*Assistant Examiner* — Tyler Paige
(74) *Attorney, Agent, or Firm* — Andrew M. Calderon; Roberts Mlotkowski Safran & Cole, P.C.

(57) ABSTRACT

A normality detector includes a steering angle yaw rate calculator, a first difference calculator, a lateral G yaw rate calculator, a second difference calculator, and a normality determination section. The steering angle yaw rate calculator calculates a steering angle yaw rate. The first difference calculator calculates a first difference which is a difference between the steering angle yaw rate and an actual yaw rate. The lateral G yaw rate calculator calculates a lateral G yaw rate. The second difference calculator calculates a second difference which is a difference between the lateral G yaw rate and the actual yaw rate. The normality determination section determines that the yaw rate detector is in a normal state when the first difference falls within a first predetermined value and the second difference falls within a second predetermined value.

20 Claims, 8 Drawing Sheets

(56) References Cited

U.S. PATENT DOCUMENTS

| | | | |
|---|---|---|---|
| 6,714,851 B2* | 3/2004 | Hrovat et al. | 701/70 |
| 7,009,558 B1* | 3/2006 | Fall et al. | 342/359 |
| 7,066,559 B2* | 6/2006 | Imamura | 303/140 |
| 7,136,730 B2* | 11/2006 | Lu et al. | 701/36 |
| 7,283,907 B2* | 10/2007 | Fujiwara et al. | 701/301 |
| 7,640,081 B2* | 12/2009 | Lu et al. | 701/1 |
| 8,195,357 B2* | 6/2012 | Basnayake | 701/33.1 |
| 8,442,720 B2* | 5/2013 | Lu et al. | 701/38 |
| 8,565,974 B2* | 10/2013 | Kojo et al. | 701/41 |
| 2004/0073351 A1 | 4/2004 | Haberhauer | |
| 2004/0090323 A1 | 5/2004 | Bieringer et al. | |
| 2006/0025910 A1 | 2/2006 | Hayashi | |
| 2008/0133101 A1* | 6/2008 | Woywod et al. | 701/83 |
| 2008/0262690 A1* | 10/2008 | Hidaka et al. | 701/70 |
| 2009/0069978 A1 | 3/2009 | Inage | |
| 2011/0071726 A1 | 3/2011 | Bechtler et al. | |

FOREIGN PATENT DOCUMENTS

| | | |
|---|---|---|
| JP | 10016744 | 1/1998 |
| JP | 2001171501 | 6/2001 |
| JP | 2002053024 | 2/2002 |
| JP | 2009-067124 | 4/2009 |
| WO | WO-02058976 A1 | 8/2002 |
| WO | WO-03039929 A1 | 5/2003 |

OTHER PUBLICATIONS

Office Action for related Application No. 2012-035246 dated Jan. 7, 2014; drafted on Dec. 25, 2013, 5 pages.

Japanese Office Action for related Application No. 2012-035246 drafted Aug. 13, 2014 and dated Aug. 19, 2014, 4 pages.

* cited by examiner

FIG. 2

VEHICLE BEHAVIOR CONTROL APPARATUS

CROSS REFERENCE TO RELATED APPLICATION

This application is based on and claims priority under 35 U.S.C. §119 to Japanese Patent Application No. 2012-35246 (filed on Feb. 21, 2012), the entire contents of which are incorporated herein by reference.

BACKGROUND

1. Technical Field

The invention relates to a vehicle behavior control apparatus and more particularly to a vehicle behavior control apparatus that can determine that a yaw rate detector is in a normal state.

2. Description of the Related Art

JP 2009-67124 A (corresponding to US 2009/0069978 A1) describes a vehicle behavior control apparatus that detects an abnormality of a yaw rate sensor while a vehicle is turning. Also JP Hei. 7-149251 A describes a device that detects an abnormality of a yaw rate sensor by comparing a yaw rate which is estimated based on a steering angle and a vehicle body velocity with a yaw rate detected by the yaw rate sensor.

SUMMARY

No device has been known heretofore that determines as to whether or not a yaw rate sensor is in a normal state after it is determined that the yaw rate sensor is an abnormal state. Since a temporary noise may lead to such a determination that the yaw rate sensor is in the abnormal state, it is desired depending upon situations that it is determined that the yaw rate sensor is in the normal state after it is determined that the yaw rate sensor is in the abnormal state, so that normal vehicle control can be performed. Therefore, for example, as described in JP Hei. 7-149251 A, such a method may be conceived that a failure determination in which a yaw rate which is estimated based on a steering angle is compared with a yaw rate detected by a yaw rate sensor is used in determination as to whether or not the yaw rate sensor is in the normal state, as it is. Namely, such a method is conceived that if a difference between the estimated yaw rate and the detected yaw rate is small, it is determined that the yaw rate sensor is in the normal state. In this case, however, if the steering wheel is turned in the abnormal state where an output of the yaw rate sensor is fixed to a certain value with a vehicle is traveling on a low friction coefficient road, certain steering angles may cause such a erroneous determination that the yaw sensor is in the normal state irrespectively of an orientation of the vehicle. In this way, it has been difficult to simply use the failure determination in determination as to whether or not the yaw rate sensor is in the normal state.

Then, the invention makes it possible to correctly determine as to whether or not a yaw rate detector is in a normal state and to perform normal vehicle control depending on the situation.

According to one embodiment of the invention, a vehicle behavior control apparatus includes a steering angle detector that detects a steering angle of a vehicle, a lateral acceleration detector that detects a lateral acceleration of the vehicle, a yaw rate detector that detects an actual yaw rate of the vehicle, and a controller that controls behavior of the vehicle based on output values from at least the steering angle detector and the yaw rate detector. The controller includes an abnormality detector and a normality detector. The abnormality detector detects as to whether or not the yaw rate detector is in an abnormal state. The normality detector detects as to whether or not the yaw rate detector is in a normal state. The normality detector includes a steering angle yaw rate calculator, a first difference calculator, a lateral G yaw rate calculator, a second difference calculator, and a normality determination section. The steering angle yaw rate calculator calculates a steering angle yaw rate based on the output value of the steering angle detector. The first difference calculator calculates a first difference which is a difference between the steering angle yaw rate and the actual yaw rate. The lateral G yaw rate calculator calculates a lateral G yaw rate based on the output value of the lateral acceleration detector. The second difference calculator calculates a second difference which is a difference between the lateral G yaw rate and the actual yaw rate. The normality determination section determines that the yaw rate detector is in the normal state when the first difference falls within a first predetermined value and the second difference falls within a second predetermined value.

With this configuration, it is determined that the yaw rate sensor is in the normal state on condition not only that the first difference, which is the difference between the steering angle yaw rate and the actual yaw rate, falls within the first predetermined value but also that the second difference, which is the difference between the lateral G yaw rate and the actual yaw rate, falls within the second predetermined value. Therefore, it is possible to accurately determine as to whether or not the yaw rate detector is in the normal state.

In the above described vehicle behavior control apparatus, the normality determination section may determine that the yaw rate detector is in the normal state when a time period for which the first difference falls within the first predetermined value and the second difference falls within the second predetermined value becomes equal to or longer than a predetermined time period.

With this configuration, even if a condition for a normal state determination is satisfied by accident due to a temporal noise, it is possible to prevent that the yaw rate detector is erroneously determined to be in the normal state. Thereby, it can be determined more accurately as to whether or not the yaw rate detector is in the normal state.

In the above described vehicle behavior control apparatus, the controller may control the behavior of the vehicle by at least pressure increasing control in which hydraulic pressures for brakes of the vehicle are increased. The controller may execute the pressure increasing control with limiting the hydraulic pressures to be equal to or smaller than a predetermined upper limit hydraulic pressure during a time period from a time at which the abnormality detector detects that the yaw rate detector is in the abnormal state to a time at which the normality detector detects that the yaw rate detector is in the normal state.

With this configuration, the pressure increasing control can be executed even if it is being detected that the yaw rate detector is in the abnormal state. Thereby, the behavior of the vehicle can be more stabilized.

In the above described vehicle behavior control apparatus, when executing the pressure increasing control during the time period from the time at which the abnormality detector detects that the yaw rate detector is in the abnormal state to the time at which the normality detector detects that the yaw rate detector is in the normal state, the controller may gradually decrease the hydraulic pressures.

With this configuration, it is possible to prevent that the pressure increasing control is executed excessively after it is detected that the yaw rate detector is in the abnormal state.

Therefore, it becomes possible to restrain the hydraulic pressures from being increased more than required when the yaw rate detector is in the abnormal state.

Accordingly, with any of the above configurations, it is possible to correctly determine as to whether or not the yaw rate detector is then a normal state.

BRIEF DESCRIPTION OF THE DRAWINGS

FIG. 2 is a diagram showing the configuration of a brake hydraulic circuit of the vehicle behavior control apparatus.

DETAILED DESCRIPTION

Next, embodiments of the invention will be described in detail with reference to the accompanying drawings.

Figure 1:
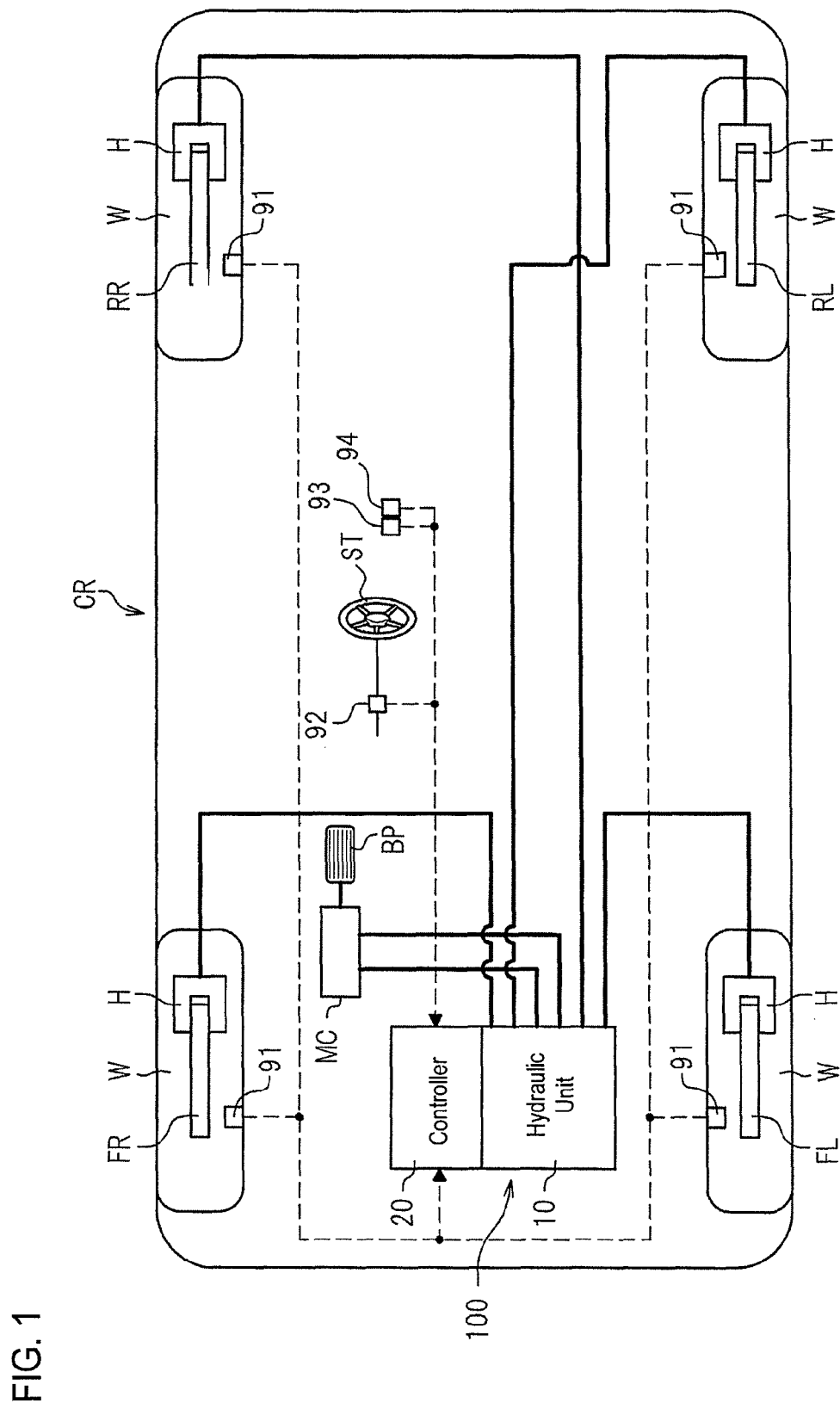
FIG. 1 is a diagram showing the configuration of a vehicle provided with a vehicle behavior control apparatus according to one embodiment of the invention.

As shown in FIG. 1, a vehicle behavior control apparatus 100 is configured to control braking forces (brake hydraulic pressures) given to individual wheels W of a vehicle CR appropriately. The vehicle behavior control apparatus 100 mainly includes a hydraulic unit 10 in which fluid lines (hydraulic pressure lines) and various parts are provided and a controller 20 that controls the various parts in the hydraulic unit 10 appropriately.

Connected to the controller 20 are wheel speed sensors 91 that detects wheel speeds of the wheels W, a steering angle sensor 92 (an example of a steering angle detector) that detects a steering angle of a steering wheel ST, a lateral acceleration sensor 93 (an example of a lateral acceleration detector) that detects an acceleration (a lateral acceleration) acting in a lateral direction the vehicle CR and a yaw rate sensor 94 (an example of a yaw rate detector) that detects a turning angular velocity (an actual yaw rate) of the vehicle CR. Respective detection results of the sensors 91 to 94 are output to the controller 20.

The controller 20 includes, for example, a CPU, a RAM, a ROM and an input/output circuit. The controller 20 executes controls by executing various arithmetic operations based inputs from the wheel speed sensors 91, the steering angle sensor 92, the lateral acceleration sensor 93 and the yaw rate sensor 94 as well as programs and/or data stored in the ROM.

Wheel cylinders H are hydraulic devices that convert a brake hydraulic pressure generated by a master cylinder MC and the vehicle behavior control apparatus 100 into operation forces of wheel breaks FR, FL, RR, RL which are provided on the respective wheels W. The wheel cylinders H are connected to the hydraulic unit 10 of the vehicle behavior control apparatus 100 via respective pipes.

Figure 2:
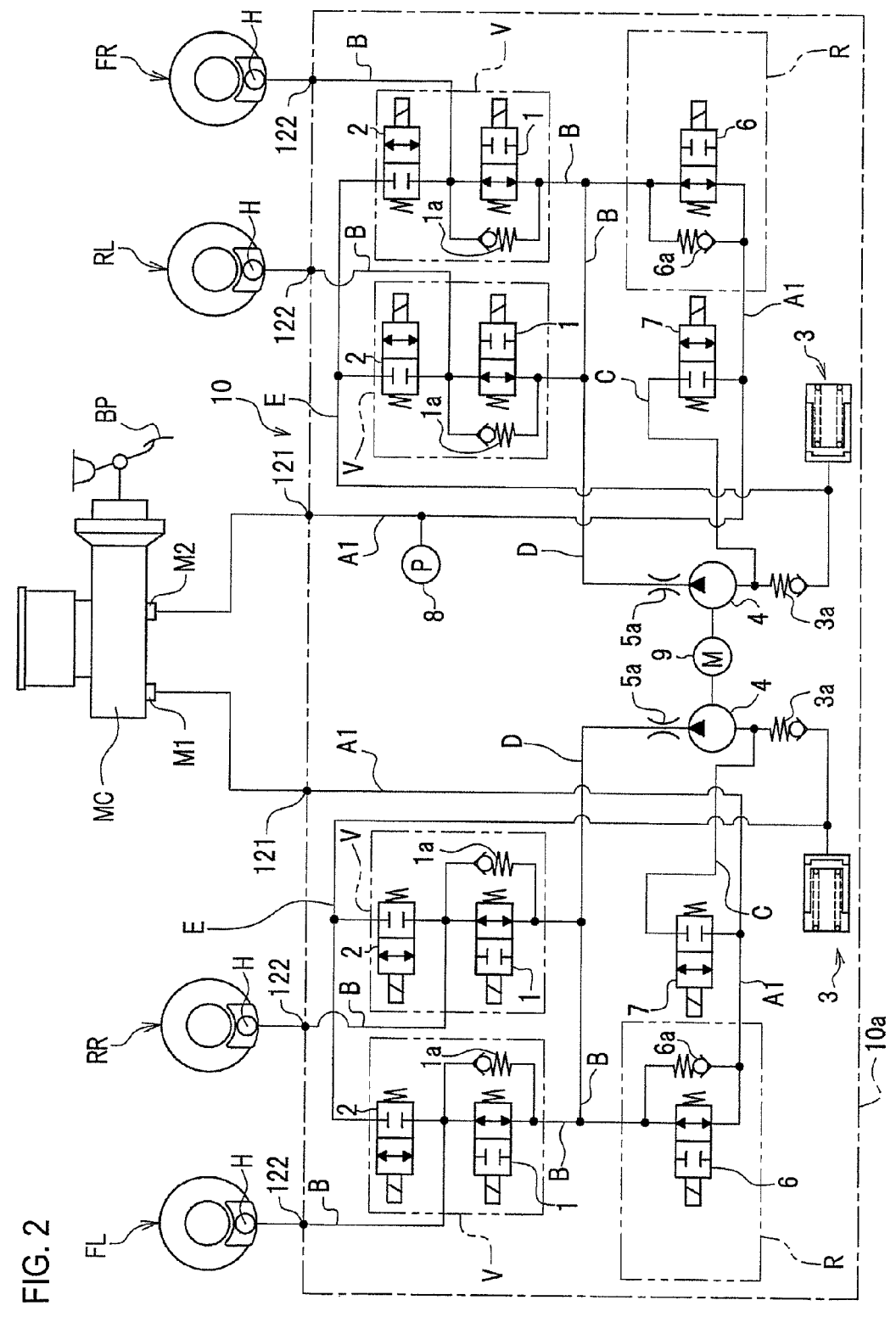

As shown in FIG. 2, the hydraulic unit 10 is disposed between the master cylinder MC and the wheel brakes FR, FL, RR, RL. The master cylinder MC is a hydraulic pressure source that generates a brake hydraulic pressure according to a pressing force applied to a brake pedal BP by a driver. The hydraulic unit 10 includes a pump body 10a, plural inlet valves 1, and plural outlet valves 2. The pump body 10a is a base body having fluid lines through which brake fluid flows. The inlet valves 1 and the outlet valves 2 are disposed on the fluid lines.

Two output ports M1, M2 of the master cylinder MC are connected to input ports 121 of the pump body 10a. Output ports 122 of the pump body 10a are connected to the wheel brakes FR, FL, RR, RL. Then, normally, fluid lines each communicates from the inlet port 121 to the outlet port 122 in the pump body 10a. Thereby, the pressing force applied to the brake pedal BP is transmitted to the respective brake wheels FL, RR, RL, FR.

The fluid line starting from the output port M1 is connected to the wheel brake FL of the front left wheel and the wheel brake RR of the rear right wheel. The fluid line starting from the output port M2 is connected to the wheel brake FR of the front right wheel and the wheel brake RL of the rear left wheel. In the following description, the fluid line starting from the output port M1 will be referred to as a "first system," and the fluid line starting from the output port M2 will be referred to as a "second system."

In the hydraulic unit 10, two control valve units V are provided so as to correspond to the wheel brakes FL, RR of the first system. Similarly, two control valve units V are provided so as to correspond to the wheel brakes RL, FR of the second system. Additionally, in the hydraulic unit 10, a reservoir 3, a pump 4, an orifice 5a, a pressure regulator valve (a regulator) R and a suction valve 7 are provided for each of the first system and the second system. Further, in the hydraulic unit 10, a motor 9 is provided and shared by the pump 4 of the first system and the pump 4 for the second system. This motor 9 is a revolution speed controllable motor. In addition, in this embodiment, a pressure sensor 8 is provided only for the second system.

In the following description, fluid lines starting from the output ports M1, M2 of the master cylinder MC to reach pressure regulator valves R are referred to as "output hydraulic pressure lines A1," and fluid lines starting from the pressure regulator valve R of the first system to reach the wheel brakes FL, RR and fluid lines starting from the pressure regulator valve R of the second system to reach the wheel brakes RL, FR are referred to as "wheel hydraulic pressure lines B." Additionally, fluid lines starting from the output hydraulic pressure lines A1 to reach the pump 4 are referred to as "suction hydraulic pressure lines C," and fluid lines starting from the pump 4 to reach the wheel hydraulic pressure lines B are referred to as "discharge hydraulic pressure lines D." Further, fluid lines starting from the wheel hydraulic pressure lines B to reach the suction hydraulic pressure line C are referred to as "release lines E."

The control valve units V are valves that control transmission of hydraulic pressure from the master cylinder MC or the pumps 4 to the wheel brakes FL, RR, RL, FR (specifically, to the wheel cylinders H). The pressures at the wheel cylinders H can be increased, held or decreased by these control valve units V. Therefore, each of the control valve units V includes an inlet valve 1, an outlet valve 2 and a check valve 1a.

The inlet valves 1 are normally open solenoid valves that are provided between the respective wheel brakes FL, RR, RL, FR and the master cylinder MC, that is, on the wheel hydraulic pressure lines B. The inlet valve 1 is normally open so as to permit transmission of the brake hydraulic pressure from the master cylinder MC to each of the wheel brakes FL, FR, RL, RR. In addition, when the corresponding wheel W is about to be locked, each inlet valve 1 is closed by the controller 20 to thereby cut off the transmission of the brake hydraulic pressure from the brake pedal BP to the corresponding one of the wheel brakes FL, FR, RL, RR.

The outlet valves 2 are normally closed solenoid valves that are provided between the wheel brakes FL, RR, RL, FR and the reservoirs 3, that is, between the wheel hydraulic pressure lines B and the release lines E. Although each outlet valve 2 is normally closed, when the corresponding wheel W is about to be locked, each outlet valve 2 is opened y the controller 20 so as to release the brake hydraulic pressure acting on the corresponding one of the wheel brakes FL, FR, RL, RR and apply the brake hydraulic pressure to the corresponding reservoir 3.

Each check valve 1a is connected parallel to the corresponding inlet valve 1. The check valves 1a are one-way valves that permit only flow of brake fluid from the respective wheel brakes FL, FR, RL, RR to the master cylinder MC. When input from the brake pedal BP is released, the check valves 1a permit the flow of the brake fluid from the respective wheel brakes FL, FR, RL, RR into the master cylinder MC.

The reservoirs 3 are provided on the release lines E. The reservoirs 3 function to absorb brake hydraulic pressures which are released when the outlet valves 2 are opened. In addition, check valves 3a are provided between the reservoirs 3 and the pump 4. The check valves 3a permit only flow of brake fluid from the reservoirs 3 to the pump 4.

The pumps 4 are provided between the suction hydraulic pressure lines C communicating with the output hydraulic pressure lines A1 and the discharge hydraulic pressure lines D communicating with the wheel hydraulic pressure lines B. The pumps 4 function to suction the brake fluid reserved in the reservoirs 3 to discharge it to the discharge hydraulic pressure lines D. Thereby, the pumps 4 can not only return the brake fluid suctioned by the reservoirs 3 to the maser cylinder MC but also generate a brake hydraulic pressure so as to generate, in turn, braking forces at the wheel brakes FL, RR, RL, FR even when the brake pedal BP is not operated by the driver.

Discharging amounts of the brake fluid by the pumps 4 depend on the number of rotations of the motor 9. For example, when the number of rotations of the motor 9 increases, the discharging amounts of the bake fluid by the pumps 4 increase.

Due to the cooperation effect of the orifices 5, the orifices 5a damp pulsation generated by the pressure of the brake fluid discharged from the pumps 4 and pulsation generated by the operation of the pressure regulator valves R, which will be described later.

The pressure regulator valves R are normally open to thereby permit the flow of the brake fluid from the output hydraulic pressure lines A1 to the wheel hydraulic pressure lines B. Additionally, when the pressures at the wheel cylinders H are increased by the brake hydraulic pressure generated by the pumps 4, the pressure regulator valves R function to regulate the pressures in the discharge hydraulic pressure lines D, the wheel hydraulic pressure lines B and the wheel cylinders H so as to be equal to or lower than a setting value. Thus, each of the pressure regulator valves R includes a selector valve 6 and a check valve 6a.

The selector valves 6 are normally open linear solenoid valves which are provided between the output hydraulic pressure lines A1 communicating with the master cylinder MC and the wheel hydraulic pressure lines B communicating with the wheel brakes FL, FR or RL, RR. Although not shown their details, a valve body of each selector valve 6 is biased towards the wheel hydraulic pressure line B and the wheel cylinder H by means of an electromagnetic force according to a current given. When the pressure in the wheel hydraulic pressure line B is increased to a predetermined value (this predetermined value being determined by a current given) or higher, as a result of the brake fluid being released from the wheel hydraulic pressure line B to the output hydraulic pressure line A1, the pressure in the wheel hydraulic pressure line B is adjusted to a predetermined pressure.

Each check valves 6a is connected parallel to the corresponding selector valve 6. The check valve 6a is one-way valves which permit the flow of the brake fluid from the output hydraulic pressure lines A1 to the wheel hydraulic pressure lines B.

The suction valves 7 are normally closed solenoid valves which are provided on the suction hydraulic pressure lines C. Each suction valves 7 is configured to switch between one state where the suction hydraulic pressure line C is released and the other state where the suction hydraulic pressure line C is shut-off. When the selector valves 6 are closed, that is, when the brake hydraulic pressures are applied to the wheel brakes FL, FR, RL, RR without operation of the brake pedal BP by the driver, the suction valves 7 are released (opened) by the controller 20.

The pressure sensor 8 is configured to detect the brake hydraulic pressure in the output hydraulic pressure line A1 in the second system. The detection result is input to the controller 20.

Next, the controller 20 will be described in detail.

Figure 3:
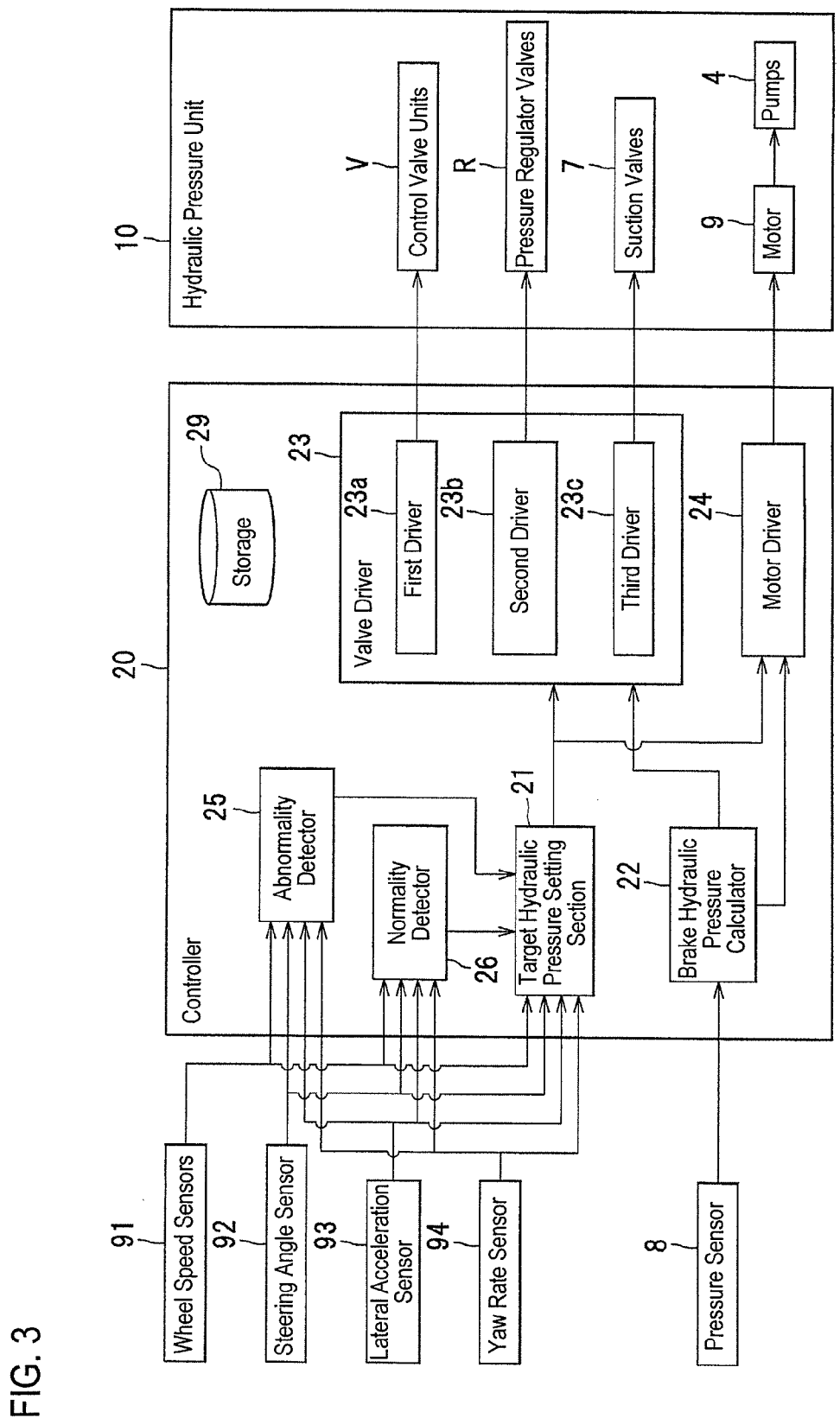
FIG. 3 is a block diagram showing the configuration of a controller.

As shown in FIG. 3, the controller 20 controls the opening and closing operations of the control valve units V, the selector valves 6 (the pressure regulator valves R) and the suction valves 7 and the operation of the motor 9 based on signals input from the respective sensors 91 to 94 and the pressure sensor 8 so as to control the operations of the respective wheel brakes FL, RR, RL, FR. The controller 20 includes a target hydraulic pressure setting section 21, a brake hydraulic pressure calculator 22, a valve driver 23, a motor driver 24, an abnormality detector 25, a normality detector 26, and a storage 29.

The target hydraulic pressure setting section 21 selects a control logic based on signals input from the sensors 91 to 94 and sets target hydraulic pressures PT for the respective wheel brakes FL, RR, RL, FR according to the selected control logic. The target hydraulic pressures PT may be set according to a known method, and the setting method is not limited to particular one.

For example, first of all, a yaw rate of the vehicle CR which is estimated based on a steering angle detected by the steering sensor 92 and a vehicle body velocity is calculated as a target yaw rate. Then, a yaw rate difference is calculated by subtracting the target yaw rate from an actual yaw rate. Then, it is determined based on the yaw rate difference as to whether the vehicle is in an oversteering state or an understeering state. Then, a moment amount necessary to correct the oversteering state or the understeering state is calculated. Further, the respective target hydraulic pressures PT for the wheel brakes FL, RR, RL, FR can be set by converting the moment amount into a brake hydraulic pressure.

In this embodiment, the results of determinations made by the abnormality detector 25 and the normality detector 26 are input into the target hydraulic pressure setting section 21, and the target hydraulic pressure setting section 21 has a function to adjust the target hydraulic pressures PT according to the determination results and to determine applied hydraulic pressures PTn which are actually applied.

Specifically, the brake hydraulic pressures (applied hydraulic pressures PTn) are limited to a lower value which is equal to or lower than a predetermined upper limit hydraulic pressure $PT_{LIM}$ during a time period from a time at which it is detected that the yaw rate sensor 94 is in the abnormal state to a time at which it is detected that the yaw rate sensor 94 is in the normal state. Namely, when the calculated target pressures PT are larger than the upper limit hydraulic pressure $PT_{LIM}$, the applied hydraulic pressures PTn at this time are set to the upper limit hydraulic pressure $PT_{LIM}$.

When the target hydraulic pressures PT is calculated, there may be a case where the target hydraulic pressures PT is calculated to be equal to the upper limit hydraulic pressure $PT_{LIM}$ so that the brake hydraulic pressures aren't excessively high. The "upper limit hydraulic pressure $PT_{LIM}$," which is applied when the yaw rate sensor 94 is in the abnormal state, is intended to give a brake hydraulic pressure which is slightly lower than that applied when the yaw rate sensor 94 is in the normal state. Therefore, the "upper limit hydraulic pressure $PT_{LIM}$" is set to be smaller value than the upper limit hydraulic pressure, which is applied when the yaw rate sensor 94 is in the normal state.

In this embodiment, the upper limit hydraulic pressure $PT_{LIM}$ is set to be reduced gradually (with time) when a pressure increasing condition for vehicle behavior control is satisfied continuously for a long time period. Therefore, the target hydraulic pressure setting section 21 counts a time since it is detected that the yaw rate sensor 94 is in the abnormal state. The upper limit hydraulic pressure $PT_{LIM}$ is set to take one of upper limit hydraulic pressures $PT_{LIM}1$, $PT_{LIM}2$, $PT_{LIM}3$, and $PT_{LIM}4$ in this order in accordance with the counted time (count) with the upper limit hydraulic pressures $PT_{LIM}1$, $PT_{LIM}2$, $PT_{LIM}3$, and $PT_{LIM}4$ getting smaller in this order (i.e., $PT_{LIM}1 > PT_{LIM}2 > PT_{LIM}3 >$ and $PT_{LIM}4$). When the pressure increasing condition is not satisfied and the series of vehicle behavior control is terminated, the upper limit hydraulic pressure $PT_{LIM}$ is reset to an initial value.

In this way, the target hydraulic pressure setting section 21 sets the applied hydraulic pressures PTn for the respective wheel cylinders H of the wheel brakes FL, RR, RL, FR.

The applied hydraulic pressures PTn set by the target hydraulic pressure setting section 21 are then output to the valve driver 23 and the motor driver 24.

The brake hydraulic pressure calculator 22 calculates brake hydraulic pressures (estimated brake hydraulic pressures) for the wheel brakes FL, RR, RL, FR based on the brake hydraulic pressure detected by the pressure sensor 8, that is, the master cylinder pressure and driving amounts of the respective solenoid valves 1, 2, 6 by the valve driver 23.

The calculated brake hydraulic pressure is output to the valve driver 23 and the motor driver 24.

The valve driver 23 controls driving of the control valve units V, the pressure regulator valves R, and the suction valves 7 based on the applied hydraulic pressures PTn and the estimated brake hydraulic pressures. To described this in more detail, the valve driver 23 outputs to the hydraulic unit 10 a pulse signal which is used to operates the inlet valves 1, the outlet valves 2, the selector valves 6 and the suction valves 7 in the hydraulic unit 10 so that the brake hydraulic pressures at the wheel cylinders H of the wheel brakes FL, RR, RL, FR coincide with the applied hydraulic pressures PTn. For example, the valve driver 23 is configured to output the pulse signal containing more pulses as a difference between the current brake hydraulic pressures at the wheel cylinders H and the applied hydraulic pressures PTn becomes larger.

The above-described valve driver 23 includes a first driver 23a that drives the control valve units V, a second driver 23b that drives the pressure regulator valves R, and a third driver 23c that drives the suction valves 7.

When it is determined based on the difference between the applied hydraulic pressures PTn and the estimated hydraulic pressures that the pressures at the wheel cylinders H should be increased, the first driver 23a opens the inlet valves 1 and closes the outlet valves 2 by not applying an electric current to the inlet valves 1 and the outlet valves 2. In addition, when the pressures at the wheel cylinders H should be reduced, the first driver 23a closes the inlet valves 1 and opens the outlet valves 2 by applying electric currents to the inlet valves 1 and the outlet valves 2, and thereby, the brake fluid in the wheel cylinders H is caused to flow out of the outlet valves 2. Further, when the hydraulic pressures at the wheel cylinders H should be maintained, the first driver 23a closes the inlet valves 1 and the outlet valves 2 by applying the electric currents to the inlet valves 1 and not applying an electric current to the outlet valves 2.

The second driver 23b does not normally apply an electric current to the pressure regulator valves R. When the applied hydraulic pressures PTn are input thereinto from the target hydraulic pressure setting section 21, the second driver 23b applies electric currents, corresponding to the applied hydraulic pressures PTn, to the pressure regulator valves R. Then, when the electric currents are applied to the pressure regulator valves R in this way, the valve bodies of the pressure regulator valves R (the selector valves 6) are biased towards the wheel hydraulic pressure lines B by electromagnetic force corresponding to the applied electric currents. When the pressures in the wheel hydraulic pressure lines B are increased by the pumps 4 and become equal to or higher than the biasing forces of the valve bodies, the brake fluid can be released to the output hydraulic pressure lines A1. Thereby, the pressures in the wheel hydraulic pressure lines B and the discharge hydraulic pressure lines D are adjusted to a predetermined pressure.

The third driver 23c does not normally apply an electric current to the suction valves 7. In addition, when it is determined based on the applied hydraulic pressures PTn output by the target hydraulic pressure setting section 21 that the pressures at the wheel cylinders H should be increased and when the master cylinder pressure detected by the pressure sensor 8 is lower than the applied hydraulic pressures PTn, the third driver 23b applies electric currents to the suction valves 7 so as to enable the pump 4 to increase the hydraulic pressure. Thereby, the suction valves 7 are opened, and the brake fluid is suctioned from the master cylinder MC into the pumps 4.

The motor driver 24 determines a rotation speed of the motor 9 based on the respective applied hydraulic pressures PTn and the estimated hydraulic pressures and then drives the motor 9. Namely, the motor driver 24 drives the motor 9 by the rotation speed control and controls the rotation speed of the motor 9 by, for example, the duty control.

The abnormality detector 25 determines as to whether or not the yaw rate sensor 94 is in the abnormal state, based on signals input from the wheel speed sensors 91, the steering angle sensor 92, the lateral acceleration sensor 93, and the yaw rate sensor 94. The method described in JP 2009-67124 A (corresponding to US 2009/0069978 A1), contents of both of which are incorporated herein by reference in their entireties, may be used to make the determination regarding the abnormal state. The abnormality detector 25 outputs the determination result to the target hydraulic pressure setting section 21.

Figure 4:
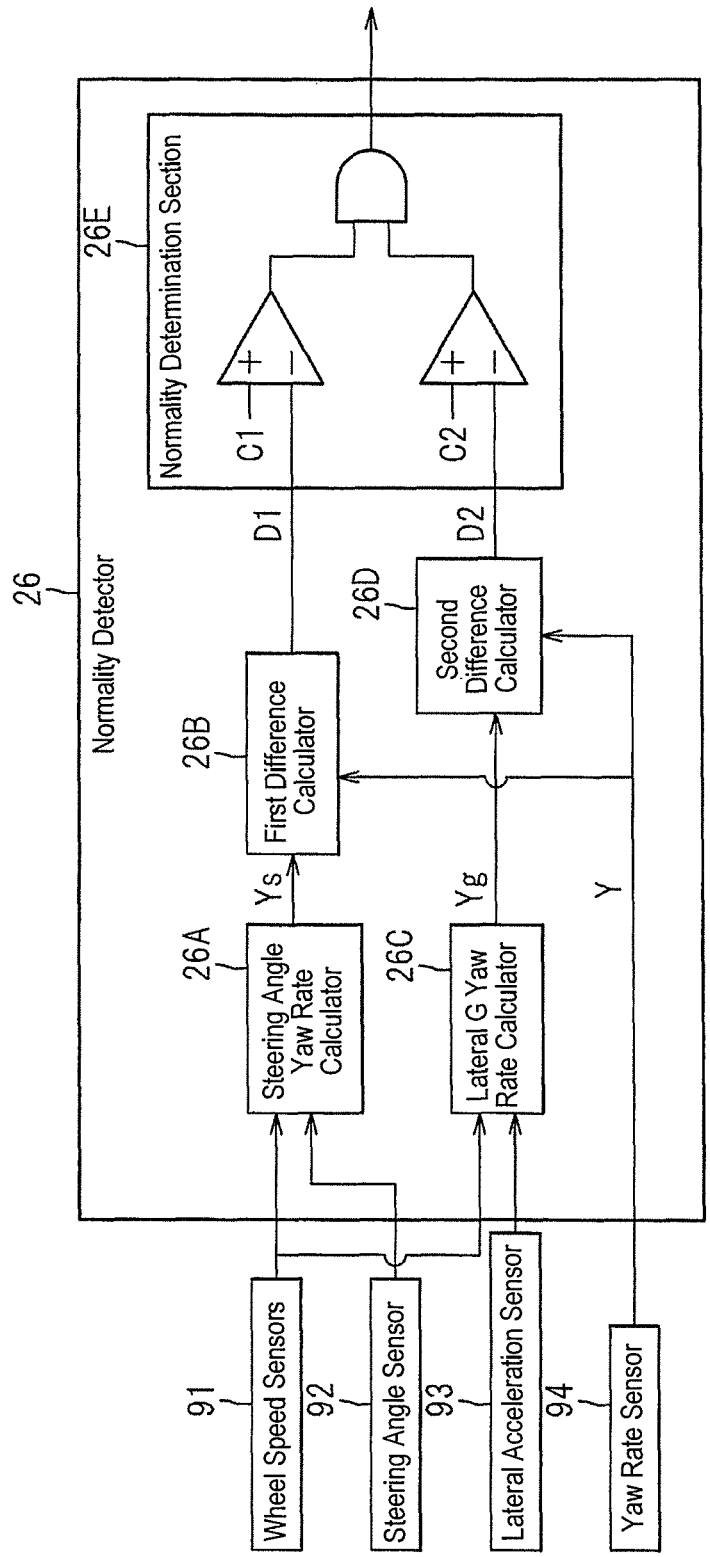
FIG. 4 is a detailed block diagram showing the configuration of a normality detector.

The normality detector 26 detects whether or not the yaw rate sensor 94 is in the normal state. As shown in FIG. 4, the normality detector 26 includes a steering angle yaw rate calculator 26A, a first difference calculator 26B, a lateral G yaw rate calculator 26C, a second difference calculator 26D, and a normality determination section 26E.

The steering angle yaw rate calculator 26A calculates a vehicle body velocity based on the wheel speeds input from the wheel speed sensors 91 and then calculates a steering angle yaw rate (a reference yaw rate) Ys based on the vehicle body velocity and the steering angle detected by the steering angle sensor 92. The steering angle yaw rate calculator 26A outputs the calculated yaw rate Ys calculated to the first difference calculator 26B.

The first difference calculator 26B calculates a difference between the steering angle yaw rate Ys calculated by the steering angle yaw rate calculator 26A and an actual yaw rate Y detected by the yaw rate sensor 94. This difference (a first difference D1) takes a positive value (an absolute value). The first difference calculator 26B outputs the first difference D1 to the normality determination section 26E.

The lateral G yaw rate calculator 26C calculates a vehicle body velocity based on the wheel speeds input from the wheel speed sensors 91 and then calculates a lateral G yaw rate Yg based on the calculated vehicle body velocity and the lateral acceleration detected by the lateral acceleration sensor 93. The lateral G yaw rate calculator 26C outputs the calculated lateral G yaw rate Yg to the second difference calculator 26D.

The second difference calculator 26D calculates a difference between the lateral G yaw rate Yg calculated by the lateral G yaw rate calculator 26C and the actual yaw rate Y detected by the yaw rate sensor 94. This difference (a second difference D2) takes a positive value (an absolute value). The second difference calculator 26D outputs the second difference D2 to the normality determination section 26E.

The normality determination section 26E determines as to whether or not the yaw rate sensor 94 is in the normal state, based on the first difference D1 and the second difference D2. Specifically, the normality determination section 26E compares a first predetermined value C1 which is stored in advance with the first difference D1 and compares a second predetermined value C2 which is stored in advance with the second difference D2. Then, when the normality determination section 26E determines that the first difference D1 is within the first predetermined value C1 and that the second difference D2 is within the second predetermined value C2, the normality determination section 26E increments a first timer TM1, and when the first timer TM1 reaches a first threshold TM1th, the normality determination section 26E determines that the yaw rate sensor 94 is in the normal state. The reason why such a determination is possible is that when the yaw rate sensor 94 is the normal state, while the vehicle is running on a road having a high friction coefficient, not only does the steering angle yaw rate Ys substantially coincide with the actual yaw rate Y, but also the lateral G yaw rate Yg should substantially coincide with the actual yaw rate Y. Thus, when the vehicle is running on a road having a low friction coefficient, even if the steering angle yaw rate Ys substantially coincides with the actual yaw rate Y by accident, the lateral G yaw rate Yg takes a value different from the actual yaw rate Y and the steering angle yaw rate Ys. Therefore, the normality determination section 26E does not erroneously determine that the yaw rate sensor 94 is in the normal state.

The normality determinations section 26E outputs the determination result to the target hydraulic pressure setting section 21.

The storage 29 stores the detection values of the sensors, as well as variables and constants which are necessary for calculations for various values.

Next, the operation of the controller 20 of the vehicle behavior control apparatus 100, which is configured as described above, will be described. Here, a normality detection process by the normality detector 26 will be described with reference to FIG. 5. Also, a pressure increasing control process, which is executed after it is detected that the yaw rate sensor 94 is in the abnormal state and before it is detected that the yaw rate sensor 94 is the normal state will be described with reference to FIG. 7.

Figure 5:
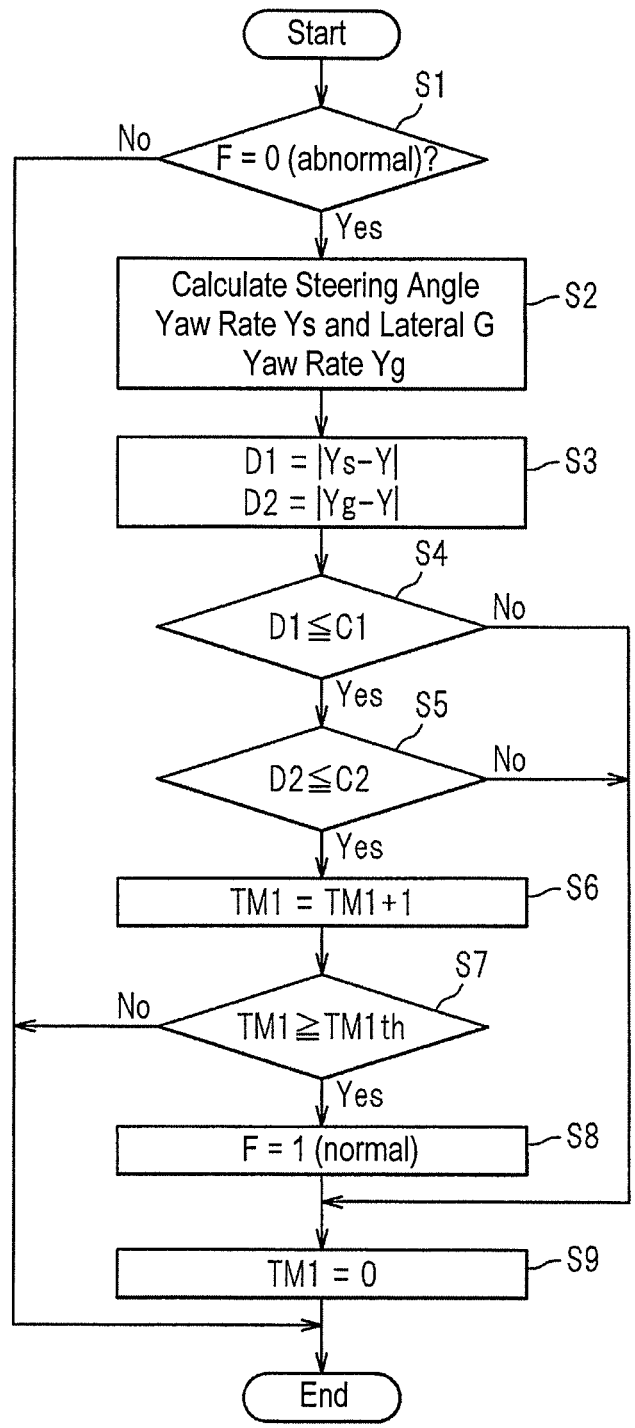
FIG. 5 is a flowchart illustrating a process, executed by the controller, to determine as to whether or not a yaw rate sensor is in a normal state.

As shown in FIG. 5, the controller 20 determines as to whether or not a flag F indicating as to whether the yaw rate sensor 94 is in the normal state or the abnormal state is 0 (it is assumed that when the flag F is 0, it indicates that the yaw rate sensor 94 is in the abnormal state, while when the flag F is 1, it indicates that the yaw rate sensor 94 is in the normal state) with referring to the flag F (S1). If the flag F is 1 (S1, No), that is, if the yaw rate sensor 94 is currently in the normal state, the normal detection process shown in FIG. 5 is terminated without determining as to whether or not the yaw rate sensor 94 is in the normal state. On the other hand, if the flag F is 0 (S1, Yes), that is, if it is currently determined that the yaw rate sensor 94 is in the abnormal state, the steering angle yaw rate calculator 26A calculates a steering angle yaw rate Ys based on the output values of the wheel speed sensors 91 and the steering angle sensor 92. Also, the lateral G yaw rate calculator 26C calculates the lateral G yaw rate Yg based on the output values of the wheel speed sensors 91 and the lateral acceleration sensor 93 (S2).

Next, the first difference calculator 26B calculates the first difference D1 based on an absolute value of a difference between the steering angle yaw rate Ys and the actual yaw rate Y. The second difference calculator 26D calculates the second difference D2 based on an absolute value of a difference between the lateral G yaw rate Yg and the actual yaw rate Y (S3).

Then, the normality determination section 26E determines as to whether or not the first difference D1 falls within the first predetermined value C1 (S4) and determines as to whether or not the second difference D2 falls within the second predetermined value C2 (S5). If these determination results are positive (Yes both in S4 and S5), the normality determination section 26E increments the first timer TM1 (S6). On the other hand, if either the determination in S4 or the determination in S5 is negative (No in S4 or S5), the process proceeds to step S9 without determining that the yaw rate sensor 94 is in the normal state, the first timer TM1 is reset (S9), and the process is terminated.

After the first timer TM1 is incremented at step S6, the normality determination section 26E determines as to whether or not the first timer TM1 is equal to or larger than the first threshold TM1th (S7). If the normality determination section 26E determines that the first timer TM1 is smaller than the first threshold TM1th (S7, No), the process is terminated without determining that the yaw rate sensor 94 is in the normal state. On the other hand, if the normality determination section 26E determines that the first timer TM1 is equal to or larger than the first threshold TM1th (S7, Yes), the normality determination section 26E determines that the yaw rate sensor 94 is in the normal state (S8, the normality determination section 26E sets the flag F to 1) and resets the first timer TM1 (S9), and the process is terminated.

Changes in the respective parameters in the case where it is determined by the above process that the yaw rate sensor 94 is in the normal state will be described with reference to FIGS. 6A to 6G.

Figure 6A:
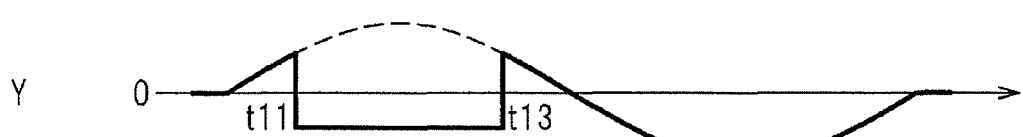
FIG. 6A to 6G are timing charts showing respective changes of parameters when it is determined as to whether or not the yaw rate sensor is in the normal state.

In FIGS. 6A to 6G it is assumed that the vehicle CR turns left on a road having a high friction coefficient and then turns right. As shown in FIG. 6A, it is further assumed that an actual yaw rate Y that is detected by the yaw rate sensor 94 while the vehicle CR is turning left is fixed to a certain value at a time t11 because of some phenomenon, error, problem or the like. At this time, the abnormality detector 25 determines at a time t12 that the yaw rate sensor 94 is in the abnormal state (see FIG. 6G). It is further assumed that thereafter, at a time t13 at which the vehicle CR is turning left, the fixing of the value of the yaw rate sensor 94 is resolved and the yaw rate sensor 94 starts to output normal values.

Figure 6B:
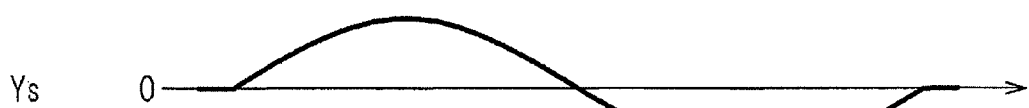
Figure 6C:
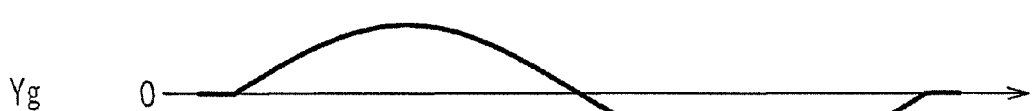
Figure 6D:
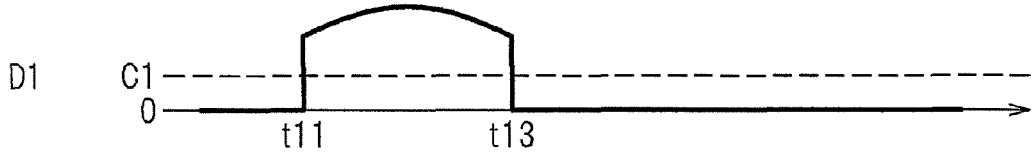
Figure 6E:
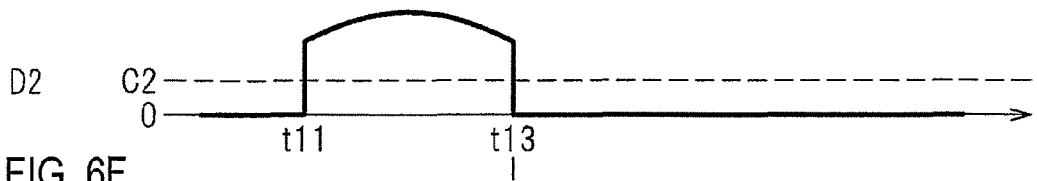
Figure 6F:
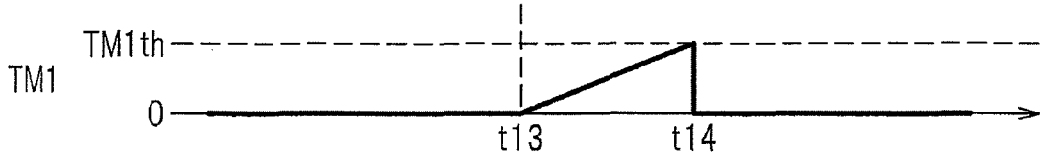
Figure 6G:
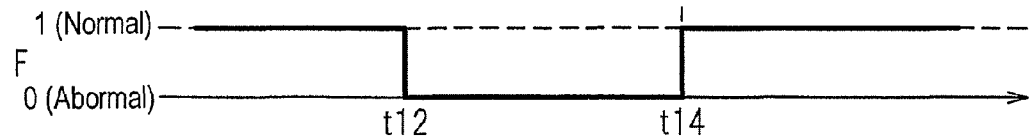

During a time period between the times t11 to t13, since the steering angle yaw rate Ys and the lateral G yaw rate Yg are not affected directly by the values of the yaw rate sensor 94, the steering angle yaw rate Ys and the lateral G yaw rate Yg change so as to indicate the tuning states of the vehicle CR substantially accurately (see FIGS. 6B and 6C). Therefore, the first difference D1 and the second difference D2 change as shown in FIGS. 6D and 6E in response to change in value of the yaw rate sensor 94. During the time period between the times t11 to t13, the first difference D1 and the second difference D2 take relatively large values. However, when the yaw rate sensor 94 starts to output the normal values at the time t13, both the first difference D1 and the second difference D2 take values close to 0. Therefore, at the time t13, the first difference D1 falls within the first predetermined value C1, and the second difference D2 falls within the second predetermined value C2. Thus, from this point in time, the normality determination section 26E starts to count the first timer TM1. Then, when the normal state of the yaw rate sensor 94 continues to a time t14 and the first timer TM 1 reaches the first threshold value TM1th, the normality determination section 26E determines that the yaw rate sensor 94 is in the normal state (see FIG. 6G).

In this manner, in the vehicle behavior control apparatus 100 of this embodiment, after the abnormality detector 25 detects that the yaw rate sensor 94 is in the abnormal state, the normality detector 26 can detect as to whether or not the yaw rate sensor 94 is in the normal state. Therefore, when the yaw rate sensor 94 is restored to the normal state after it is temporarily detected due to some noise that the yaw rate sensor 94 is in the abnormal state, it becomes possible to restart the normal vehicle behavior control. Then, in making such a determination, it is detected that the yaw rate sensor 94 is in the normal state, on condition not only that the first difference D1, which is the difference between the steering angle yaw rate Ys and the actual yaw rate Y, falls within the first predetermined value C1 but also that the second difference D2, which is the difference between the lateral G yaw rate Yg and the actual yaw rate Y, falls within the second predetermined value C2. Therefore, it can be determined accurately that the yaw rate sensor 94 is in the normal state.

Figure 7:
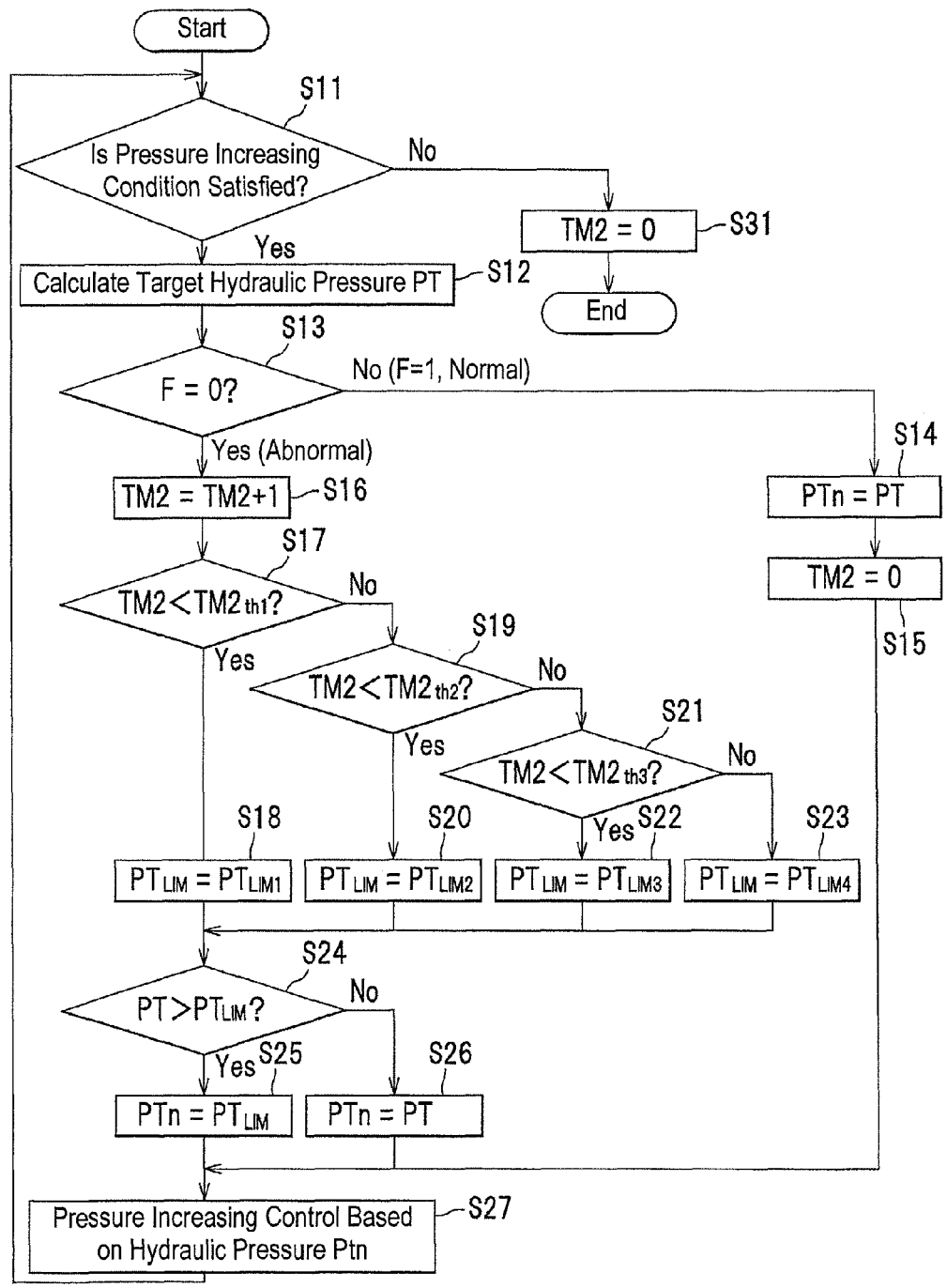
FIG. 7 is a flowchart illustrating a pressure increasing control process after it is determined that the yaw rate sensor is in an abnormal state.

Next, with reference to FIG. 7, the pressure increasing control process, which is executed after it is detected that the yaw rate sensor 94 is in the abnormal state and before it is detected that the yaw rate sensor 94 is in the normal state.

As shown in FIG. 7, the controller 20 determines as to whether or not a pressure increasing condition is satisfied (S11). If the controller 20 determines that the pressure increasing condition is not satisfied (S11, No), the controller 20 resets a second timer TM2 (S31), and the process is terminated. At this time, the upper limit hydraulic pressure $PT_{LIM}$ may be reset to the initial value. On the other hand, if the controller 20 determines that the pressure increasing condition is satisfied (S11, Yes), the target hydraulic pressure setting section 21 calculates the target hydraulic pressure PT (S12). Then, the target hydraulic pressure setting section 21 determines as to whether or not the flag F is 0 (S13). If the flag F is 1, that is, if it is determined that the yaw rate sensor 94 is in the normal state, the target hydraulic pressure setting section 21 sets the applied hydraulic pressures PTn at this time to the calculated target hydraulic pressures PT (S14), and the second timer TM2 is reset (S15).

On the other hand, if the target hydraulic pressure setting section 21 determines that the flag F is 0 (S13, Yes), the target hydraulic pressure setting section 21 increments the second timer TM2 (S16). Then, the target hydraulic pressure setting section 21 determines as to whether or not the second timer TM2 is smaller than a threshold TM2th1 (S17). If the target hydraulic pressure setting section 21 determines that the second timer TM2 is smaller than the threshold TM2th1 (S17, Yes), the target hydraulic pressure setting section 21 sets the upper limit hydraulic pressure $PT_{LIM}$ to the upper limit hydraulic pressure $PT_{LIM}1$ (S18). If the target hydraulic pressure setting section 21 determines that the second timer TM2 is equal to or larger than the threshold TM2th1 (S17, No), the target hydraulic pressure setting section 21 determines as to whether or not the second timer TM2 is smaller than a threshold TM2th2 (S19). If the target hydraulic pressure setting section 21 determines that the second timer TM2 is smaller than the threshold TM2th2 (S19, Yes), the target hydraulic pressure setting section 21 sets the upper limit hydraulic pressure $PT_{LIM}$ to the upper limit hydraulic pressure $PT_{LIM}2$ (S20). If the target hydraulic pressure setting section 21 determines that the second timer M2 is equal to or larger than the threshold TM2th2 (S19, No), the target hydraulic pressure setting section 21 further determines as to whether or not the second timer TM2 is smaller than a threshold TM2th3 (S21). If the target hydraulic pressure setting section 21 determines that the timber TM2 is smaller than the threshold TM2th3 (S21, Yes), the target hydraulic pressure setting section 21 sets the upper limit hydraulic pressure $PT_{LIM}$ to the upper limit hydraulic pressure $PT_{LIM}3$ (S22). If the target hydraulic pressure setting section 21 determines that the second timer TM2 is equal to or larger than the threshold TM2th3 (S21, No), the target hydraulic pressure setting section 21 sets the upper limit hydraulic pressure $PT_{LIM}$ to the upper limit hydraulic pressure $PT_{LIM}4$ (S23).

When the upper limit hydraulic pressure $PT_{LIM}$ is determined in the way described above, the target hydraulic pressure setting section 21 compares the target hydraulic pressure PT with the upper limit hydraulic pressure $PT_{LIM}$. If the target hydraulic pressure PT is larger than the upper limit hydraulic pressure $PT_{LIM}$ (S24, Yes), the target hydraulic pressure setting section 21 sets the hydraulic pressures PTn to the upper limit hydraulic pressure $PT_{LIM}$ (S25). If the target hydraulic pressure PT is equal to or smaller than the upper limit hydraulic pressure $PT_{LIM}$ (S24, No), the target hydraulic pressure setting section 21 sets the applied hydraulic pressures PTn to the target hydraulic pressure PT (S26). The target hydraulic pressure setting section 21 then outputs the applied hydraulic pressures PTn to the valve driver 23 and the motor driver 24. Thereby, the pressure increasing control is executed based on the applied hydraulic pressures PTn (S27).

Changes in respective parameters in the case where the pressure increasing control is executed by the above described process after it is determined that the yaw rate sensor 94 is in the abnormal state will be described with reference to FIGS. 8A to 8E.

Figure 8A:
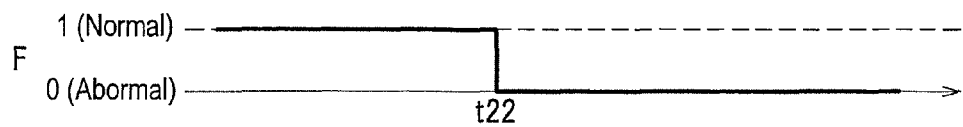
FIG. 8A to 8E are timing charts showing changes of respective parameters when the pressure increasing control is executed after it is determined that the yaw rate sensor is in the abnormal state.
Figure 8B:
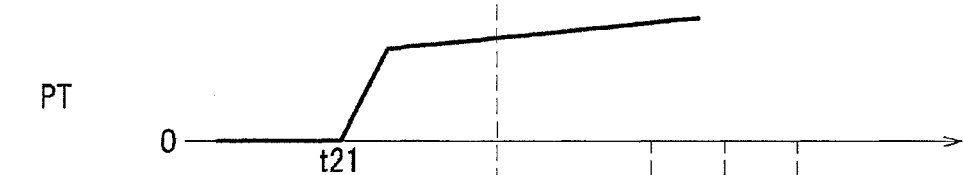
Figure 8C:
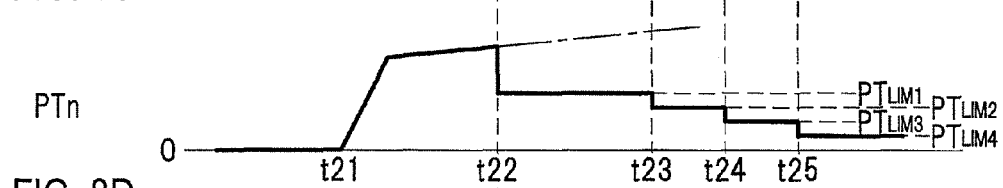
Figure 8D:
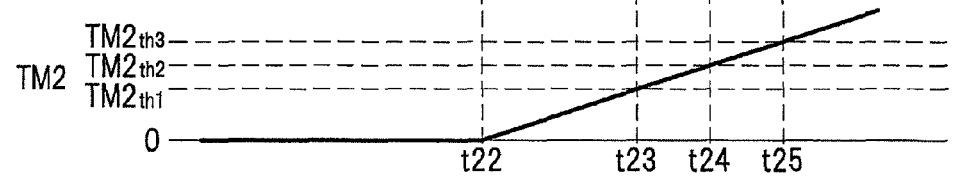
Figure 8E:
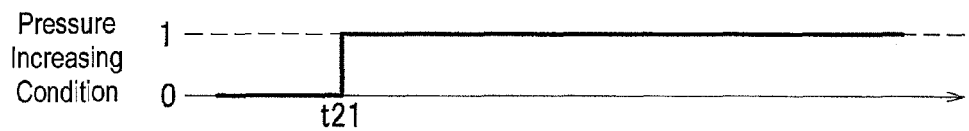

As shown in FIGS. 8A to 8E, when the pressure increasing condition is satisfied at a time t21 (see FIG. 8E) in a state where the yaw rate sensor 94 is in the normal state (see FIG. 8A), the target hydraulic pressure PT rises as shown in FIG. 8B, and the applied hydraulic pressures PTn also rise so as to follow the target hydraulic pressure PT as shown in FIG. 8C.

When the abnormality detector 25 detects at a time t22 that the yaw rate sensor 94 is in the abnormal state, the target hydraulic pressure setting section 21 decreases the applied hydraulic pressures PTn to the upper limit hydraulic pressure $PT_{LIM}$ and starts to count the second timer TM2. Then, every time the count of the second timer TM2 reaches any of the thresholds TM2th1, TM2th2 and TM2th3, the target hydraulic pressure setting section 21 decreases the applied hydraulic pressures PTn step by step (see times t23, t24, and t25). In this embodiment, a time period (corresponding to TM2th1) up to a time at which the upper limit hydraulic pressure $PT_{LIM}$ has been decreased to $PT_{LIM}1$ for the first time is longer than a time period (corresponding to TM2th2−TM2th1) up to a time the upper limit hydraulic pressure $PT_{LIM}$ has been decreased for the second time and a time period (corresponding to TM2th3−TM2th2) up to a time at which the upper limit hydraulic pressure $PT_{LIM}$ has been decreased for the third time.

In FIGS. 8A to 8E, the example is illustrated in which the pressure increasing condition is satisfied in a state where the yaw rate sensor 94 is determined to be in the normal state. However, when the pressure increasing condition is satisfied in a state where the yaw rate sensor 94 is determined to be in the abnormal state, the pressure increasing control is started with the hydraulic pressure which falls within the upper limit hydraulic pressure $PT_{LIM}$. In addition, the second timer TM2 is started to be counted from the beginning of the pressure increasing control (since when the pressure increasing condition and the condition of F=0 are satisfied) (not shown).

In this way, according to the vehicle behavior control apparatus 100 of this embodiment, even after the abnormality detector 25 detects an abnormality of the yaw rate sensor 94, the pressure increasing control can be executed with the hydraulic pressure equal to or smaller than that when the yaw rate sensor 94 is in the normal state. Therefore, the vehicle can be further stabilized even to a small extent. In addition, the pressure increasing control when the yaw rate sensor 94 is determined to be in the abnormal state is executed moderately within the upper limit hydraulic pressure $PT_{LIM}$, which is decreased gradually. Therefore, it is possible to suppress increase in hydraulic pressure more than required in a state where the yaw rate sensor 94 is in the abnormal state.

Thus, while the invention has been described based on the embodiments, it should be noted that the invention is not limited thereto. The specific configuration may be modified as required without departing from the spirit and scope of the invention.

For example, in the embodiment, it is determined that the yaw rate sensor 94 is in the normal state when a state in which the first difference D1 is equal to or less the first predetermined value C1 and the second difference D2 is equal to or less than the second predetermined value C2 continues by the first threshold TM1th or longer. However, it may be immediately determined that the yaw rate sensor 94 is in the normal state when the first difference D1 is equal to or less than the first predetermined value C1 and the second difference D2 is equal to or less than the second predetermined value C2. It should be noted that in the case where such a condition is adopted that the state in which the first difference D1 is equal to or less than the first predetermined value C1 and the second difference D2 is equal to or less than the second predetermined value C2 continue the first threshold TM1th or longer as in the embodiment, it is possible to more surely suppress that it is erroneously determined that the yaw rate sensor 94 is in the normal state due to a temporal noise in output value of the yaw rate sensor 94.

In the embodiment, the case where the applied hydraulic pressures PTn (the upper limit hydraulic pressure $PT_{LIM}$) are decreased in a stepwise manner has been described as one example of that the applied hydraulic pressures PTn (the upper limit hydraulic pressure $PT_{LIM}$) are decreased gradually in the pressure increasing control after it is detected that the yaw rate sensor 94 is in the abnormal state. However, the applied hydraulic pressures PTn (the upper limit hydraulic pressure $PT_{LIM}$) may be decreased smoothly at a constant gradient, for example. In addition, it is not necessary to decrease the applied hydraulic pressures PTn (the upper limit hydraulic pressure $PT_{LIM}$) with time.

What is claimed is:

1. A vehicle behavior control apparatus comprising:
   a steering angle detector that detects a steering angle of a vehicle;
   a lateral acceleration detector that detects a lateral acceleration of the vehicle;
   a yaw rate detector that detects an actual yaw rate of the vehicle; and
   a controller that controls behavior of the vehicle based on output values from at least the steering angle detector and the yaw rate detector, wherein
   the controller includes
      an abnormality detector that detects as to whether or not the yaw rate detector is in an abnormal state; and
      a normality detector that detects as to whether or not the yaw rate detector is in a normal state, and
   the normality detector includes
      a steering angle yaw rate calculator that calculates a steering angle yaw rate based on the output value of the steering angle detector,
      a first difference calculator that calculates a first difference which is a difference between the steering angle yaw rate and the actual yaw rate;
      a lateral G yaw rate calculator that calculates a lateral G yaw rate based on the output value of the lateral acceleration detector;
      a second difference calculator that calculates a second difference which is a difference between the lateral G yaw rate and the actual yaw rate, and
      a normality determination section that determines that the yaw rate detector is in the normal state when the first difference falls within a first predetermined value and the second difference falls within a second predetermined value.

2. The vehicle behavior control apparatus according to claim 1, wherein the normality determination section determines that the yaw rate detector is in the normal state when a time period for which the first difference falls within the first predetermined value and the second difference falls within the second predetermined value becomes equal to or longer than a predetermined time period.

3. The vehicle behavior control apparatus according to claim 1, wherein the controller controls the behavior of the vehicle by at least pressure increasing control in which hydraulic pressures for brakes of the vehicle are increased, and the controller executes the pressure increasing control with limiting the hydraulic pressures to be equal to or smaller than a predetermined upper limit hydraulic pressure during a time period from a time at which the abnormality detector detects that the yaw rate detector is in the abnormal state to a time at which the normality detector detects that the yaw rate detector is in the normal state.

4. The vehicle behavior control apparatus according to claim 3, wherein when executing the pressure increasing control during the time period from the time at which the abnormality detector detects that the yaw rate detector is in the abnormal state to the time at which the normality detector detects that the yaw rate detector is in the normal state, the controller gradually decreases the hydraulic pressures.

5. The vehicle behavior control apparatus according to claim 2, wherein the controller controls the behavior of the vehicle by at least pressure increasing control in which hydraulic pressures for brakes of the vehicle are increased, and the controller executes the pressure increasing control with limiting the hydraulic pressures to be equal to or smaller than a predetermined upper limit hydraulic pressure during a time period from a time at which the abnormality detector detects that the yaw rate detector is in the abnormal state to a time at which the normality detector detects that the yaw rate detector is in the normal state.

6. The vehicle behavior control apparatus according to claim 5, wherein when executing the pressure increasing control during the time period from the time at which the abnormality detector detects that the yaw rate detector is in the abnormal state to the time at which the normality detector detects that the yaw rate detector is in the normal state, the controller gradually decreases the hydraulic pressures.

7. The vehicle behavior control apparatus according to claim 1, wherein the controller controls opening and closing operations of control valve units, selector valves and suction valves and operation of a motor based on signals input from the steering angle detector, the lateral acceleration detector and the yaw rate detector.

8. The vehicle behavior control apparatus according to claim 1, wherein the controller further includes a target hydraulic pressure setting section, a brake hydraulic pressure calculator, and a valve driver.

9. The vehicle behavior control apparatus according to claim 8, wherein the target hydraulic pressure setting section selects a control logic based on signals input from at least the steering angle detector, the lateral acceleration detector and the yaw rate detector and sets target hydraulic pressures for respective wheel brakes according to the selected control logic.

10. The vehicle behavior control apparatus according to claim 9, wherein
the yaw rate of the vehicle which is estimated based on the steering angle detected by the steering detector and a vehicle body velocity is calculated as a target yaw rate,
a yaw rate difference is calculated by subtracting the target yaw rate from the actual yaw rate, and
an oversteering state or an understeering state is determined based on the yaw rate difference.

11. The vehicle behavior control apparatus according to claim 10, wherein determinations made by the abnormality detector and the normality detector are input into the target hydraulic pressure setting section, and the target hydraulic pressure setting has a function to adjust the target hydraulic pressures according to the determination and to determine applied hydraulic pressures (PTn) which are actually applied.

12. The vehicle behavior control apparatus according to claim 11, wherein the applied hydraulic pressures (PTn) are limited to a lower value which is equal to or lower than an upper limit hydraulic pressure ($PT_{LIM}$) during a time period from a time at which it is detected that the yaw rate detector is in the abnormal state to a time at which it is detected that the yaw rate detector is in the normal state.

13. The vehicle behavior control apparatus according to claim 12, wherein when the upper limit hydraulic pressure ($PT_{LIM}$) which is applied when the yaw rate detector is in the abnormal state, a brake hydraulic pressure is lower than that applied when the yaw rate detector is in the normal state.

14. The vehicle behavior control apparatus according to claim 13, wherein the upper limit hydraulic pressure ($PT_{LIM}$) is set to be a smaller value than the upper limit hydraulic pressure ($PT_{LIM}$), which is applied when the yaw rate detector is in the normal state.

15. The vehicle behavior control apparatus according to claim 14, wherein the upper limit hydraulic pressure ($PT_{LIM}$) is set to be reduced with a certain time period when a pressure increasing condition is satisfied continuously for a predetermined time period.

16. The vehicle behavior control apparatus according to claim 1, wherein the steering angle yaw rate calculator calculates a vehicle body velocity based on wheel speeds input from wheel speed sensors and then calculates the steering angle yaw rate based on the vehicle body velocity and the steering angle detected by the steering angle detector.

17. The vehicle behavior control apparatus according to claim 1, wherein the lateral G yaw rate calculator calculates a vehicle body velocity based on wheel speeds input from the wheel speed sensors and then calculates the lateral G yaw rate based on the calculated vehicle body velocity and the lateral acceleration detected by the lateral acceleration detector.

18. The vehicle behavior control apparatus according to claim 1, wherein the normality determination section compares the first predetermined value which is stored in advance with the first difference and compares the second predetermined value which is stored in advance with the second difference.

19. The vehicle behavior control apparatus according to claim 18, wherein
when the normality determination section determines that the first difference is within the first predetermined value and that the second difference is within the second predetermined value, the normality determination section increments a first timer, and
when the first timer reaches a first threshold, the normality determination section determines that the yaw rate detector is in the normal state.

20. The vehicle behavior control apparatus according to claim 19, wherein
when the yaw rate detector is the normal state, while the vehicle is running on a road having a high friction coefficient, the steering angle yaw rate substantially coincides with the actual yaw rate and the lateral G yaw rate substantially coincides with the actual yaw rate, and
when the vehicle is running on a road having a low friction coefficient, even if the steering angle yaw rate substantially coincides with the actual yaw rate by accident, the lateral G yaw rate Yg takes a value different from the actual yaw rate and the steering angle yaw rate and the normality determination section does not erroneously determine that the yaw rate detector is in the normal state.

* * * * *